United States Patent [19]

Asay

[11] Patent Number: 5,062,291
[45] Date of Patent: Nov. 5, 1991

[54] CALIBRATION OF FLOWMETERS USING A DISSOLVED ARGON TRACER TECHNIQUE

[75] Inventor: Roger H. Asay, Santa Clara, Calif.

[73] Assignee: Radiological & Chemical Technology, Inc., San Jose, Calif.

[21] Appl. No.: 332,619

[22] Filed: Apr. 3, 1989

[51] Int. Cl.$^5$ .............................................. G01F 25/00
[52] U.S. Cl. .......................................................... 73/3
[58] Field of Search ............................................. 73/3

[56] References Cited

U.S. PATENT DOCUMENTS

| | | | |
|---|---|---|---|
| 3,028,744 | 4/1962 | Bagwell et al. | 73/3 |
| 3,455,143 | 7/1969 | Shamp | 73/3 |
| 3,741,009 | 6/1973 | Bordeaux | 73/3 X |
| 4,163,891 | 8/1979 | Komatsu et al. | 219/121.48 X |
| 4,537,058 | 8/1985 | Luper | 73/3 |

Primary Examiner—Thomas Noland
Attorney, Agent, or Firm—Fliesler, Dubb, Meyer & Lovejoy

[57] ABSTRACT

A method and apparatus are set forth for calibration of a flowmeter in a system having a condensible fluid flowing in it. A known volume of a liquid test solution is inserted into the system flowpath upstream of the flowmeter with the solution having dissolved in it a known concentration of an inert gas. The indicated flowrate is observed on the flowmeter. The concentration of the inert gas present in the condensed fluid downstream of the flowmeter is measured. This allows a determination of the true flowrate which corresponds to the flowrate indicated by the flowmeter. The method and apparatus of the invention are particularly useful wherein the system is a heat transfer system of a power plant.

43 Claims, 2 Drawing Sheets

`5,062,291`

CALIBRATION OF FLOWMETERS USING A DISSOLVED ARGON TRACER TECHNIQUE

TECHNICAL FIELD

The present invention relates to a method and apparatus for calibrating flowmeters which measure fluid flow in a system. The method and apparatus are particularly useful for calibrating flowmeters in the heat transfer systems of power plants, including fossil fuel plants and various nuclear power plants.

BACKGROUND OF THE INVENTION

Various liquids, often water, are used as heat transfer media in power plants. The liquid is heated to vaporize it, the vaporous fluid flows through a flow system, usually an enclosed system, and, still within the system, expands to drive a turbine or the like. Thereafter, the fluid is condensed and is cycled back to the portion of the flowpath wherein it is heated. In the case of a nuclear reactor this portion can be where it is contacted with walls heated by an intermediate heat transfer fluid which can be water or sodium, in fossil fuel plants this can be through contact of pipes which contain the fluid with hot walls, flames or hot gases created by the combustion of fossil fuel.

As a fluid, for example water, circulates through such a heat transfer system it can pick up corrosion products and deposit them throughout the system, including in the flowmeters of the system. As a result, even if each flowmeter is precisely calibrated before it is put into use in such a system the calibration is no longer accurate after a period of time. Thus, it is desirable to periodically recalibrate flowmeters. In large heat transfer systems of the nature used in power plants (wherein flow rates are generally $5 \times 10^6$ Kg/hour or more) the most accurate method for field calibration is the radioactive sodium-24 tracer method. Carrying out this method is very expensive, however, and is generally not viable for applications outside of the nuclear industry as a radioactive materials license is required. Additionally, manufacture, transport and disposal of the radioactive sodium-24 tracer is both very expensive and very highly trained manpower intensive.

There are other calibration methods which exist using non-radioactive chemical tracers and which use chemicals dissolved in the system liquid. However, these methods have technical problems associated with them. First, chemical additives can be deleterious to materials in the system and can become concentrated in the boilers of power plants causing accelerated localized corrosion. Perhaps the best commercial chemical tracers found to date are potassium and lithium. A soluble salt or base compound must be used, however, to inject them into the flow system. The associated anion can be much more deleterious to the system than the cation tracer. Lithium is the preferred chemical tracer since it can be introduced as the base, lithium hydroxide. This can, however, impact water quality specifications for plants using ultrapure feed water.

The sensitivity and accuracy of the analysis for the tracer are the ultimate criteria for all the tracer techniques. With flow rates of $5 \times 10^{-6}$ Kg/hr or greater any tracer is very highly diluted before a sample is taken for analysis. The radioactive sodium technique is the most accurate method since accurate detectability in the samples is feasible in the sub part per trillion concentration range. Because the best chemical techniques for elemental analysis are in the part per billion range, without concentration, the chemical tracer method is not sensitive enough and is therefore very subject to error. A flow element must be calibrated with errors of less than about 0.25%. Therefore, if analytical errors or sample concentration errors are greater than this, the chemical tracer method is rendered useless.

The present invention is directed to overcoming one or more of the problems as set forth above.

DISCLOSURE OF INVENTION

In accordance with an embodiment of the present invention a method is set forth of calibrating a flowmeter in situ in a system having a condensible fluid flowing in a flowpath through the system. The method comprises injecting a known volume of a liquid test solution into the flowpath upstream of the flowmeter through which the fluid in condensed form is flowed, the test solution having dissolved therein a known concentration of an inert gas. The flowrate indicated by the flowmeter being calibrated is observed. The concentration of the inert gas present in the condensed form of the fluid is measured at a position in the flowpath downstream of the flowmeter. The true flowrate corresponding to the indicated flowrate is determined.

In accordance with another embodiment of the present invention an apparatus is set forth for calibrating a flowmeter in a system having a condensible fluid flowing in a flowpath in it. The apparatus comprises a known volume of a test solution having a known concentration of an inert gas dissolved in it. Insertion means are provided for inserting the test solution into the system upstream of the flowmeter. Measuring means are provided for measuring the concentration of the inert gas at a position in the system downstream of the flowmeter. Comparison means are present for comparing the true flowrate as calculated from the concentration of the inert gas measured by the measuring means with the indicator flowrate as indicated by the flowmeter.

The present invention provides a tracer technique utilizing an inert gas as the tracer element. By using an inert gas, preferably argon which is a constituent of air, one can perform the entire tracer method without adding deleterious chemicals or prohibitively costly radioactive tracers. In the case of argon the solubility characteristics of that element are very favorable for this type of application, it is inert, it is readily available, it is inexpensive and it can be analyzed for in parts per trillion concentrations in water.

BRIEF DESCRIPTION OF THE DRAWINGS

The invention will be better understood by reference to the FIGURES of the drawings wherein.

BEST MODE FOR CARRYING OUT INVENTION

Figure 1:
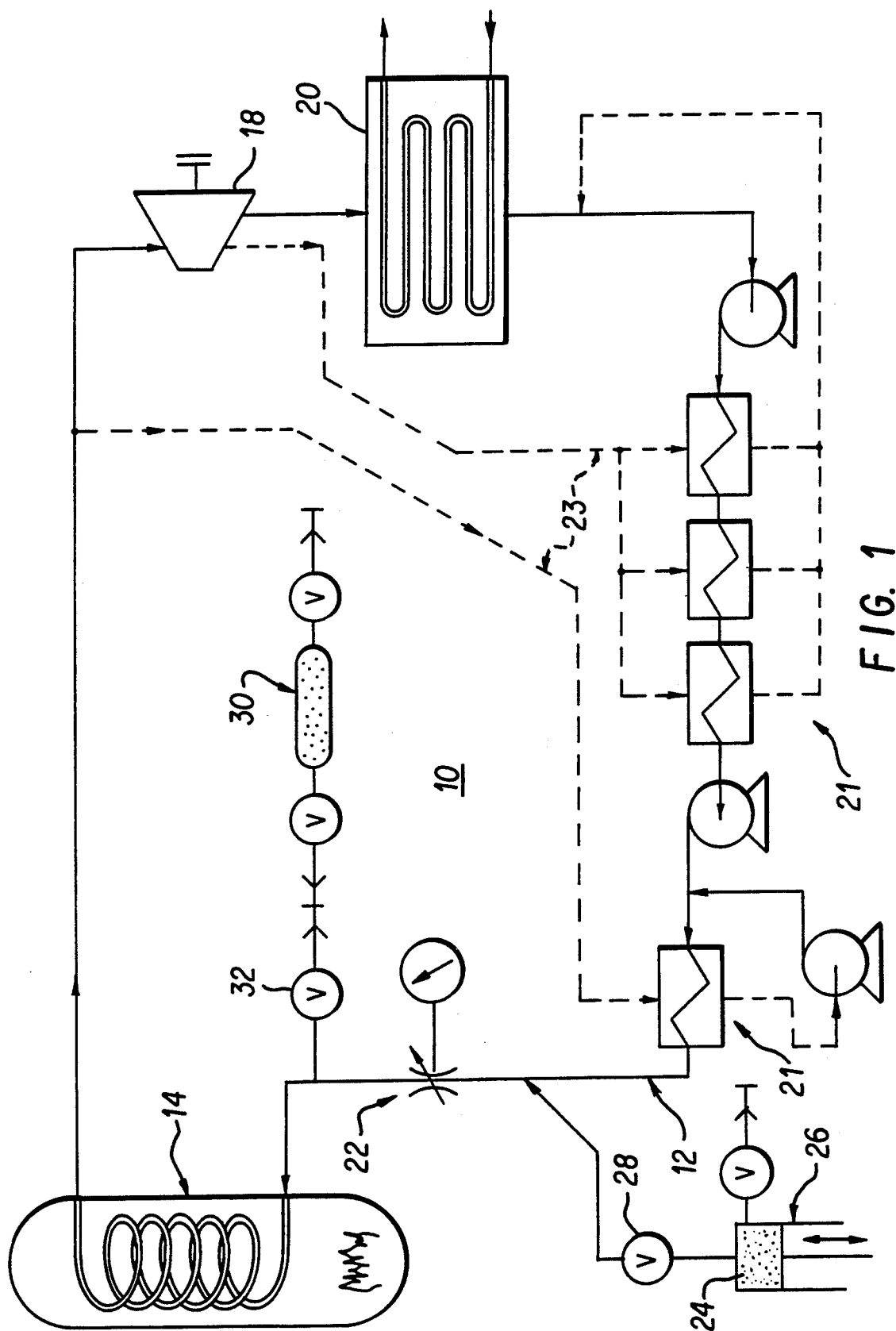
FIG. 1 illustrates, schematically, an embodiment of an apparatus in accordance with the present invention.

FIG. 1 shows a system 10 having a condensible fluid flowing in a flowpath represented by the line 12. The particular sealed system shown is in the nature of a heat transfer system of a power plant with heat being generated by a heat generating element indicated schematically at 14. The heat generating element can be a nuclear reactor, a fossil fuel combustion chamber, or the like. The direction of fluid flow through the system 12 is indicated by arrows in the line 12.

Hot fluid (steam) exits the heat generator 14 generally at a pressure of 1,000 psi or more and at a temperature of 550° F. or more, expands in a turbine 18, is condensed in a condensor 20 to form condensed fluid at (typically) about 120° F., passes through intermediate warming heaters 21 whereat its temperature is increased to (typically) about 400° F. and its pressure to (typically) about 1,200 psi and a flowmeter 22, and then returns to the heat generator 14. A small amount of the hot fluid exiting the heat generator 14 is used to warm the fluid exiting the condensor 20 before returning it to the heat generator 14. The fluid streams, indicated by the dashed lines 23, are recycled back into the system 10. Thus, a generally closed loop operation results. Appropriate taps are generally provided for adding to and removing fluid from the system, as needed. The flow of high pressure hot condensed fluid past the flowmeter 22 can be read directly on the flowmeter.

In accordance with the present invention a known volume of a test solution 24, which has a known concentration of an inert gas dissolved in it, is inserted, for example, from the cylinder 26 via a valve 28, into the system 12 upstream of the flowmeter 22. The insertion means for inserting the test solution 24, in the embodiment illustrated, comprises a cylinder and piston arrangement which is calibrated to provide a very specific volume of test solution and to cause that volume to flow through the valve 28 and into the system 12. This is only one of many structures that can be utilized for this purpose.

Downstream of the flowmeter 22 there is provided a measuring means for measuring the concentration of the inert gas. The measuring means illustrated is a small sampler cylinder 30 by which a sample can be taken from the system 12. For example, the sampler 30 can be evacuated before being connected to the valve 32 and then the valve 32 can be opened whereby the liquid flowing in the system enters the sampler 30. While it is possible to sample the steam and to measure the flow of steam such is generally undesirable as it is difficult to get an accurate balance around the system 10. It is possible to omit the cylinder 30 and to directly analyze aliquots of condensed fluid, for example as explained below.

Figure 2:
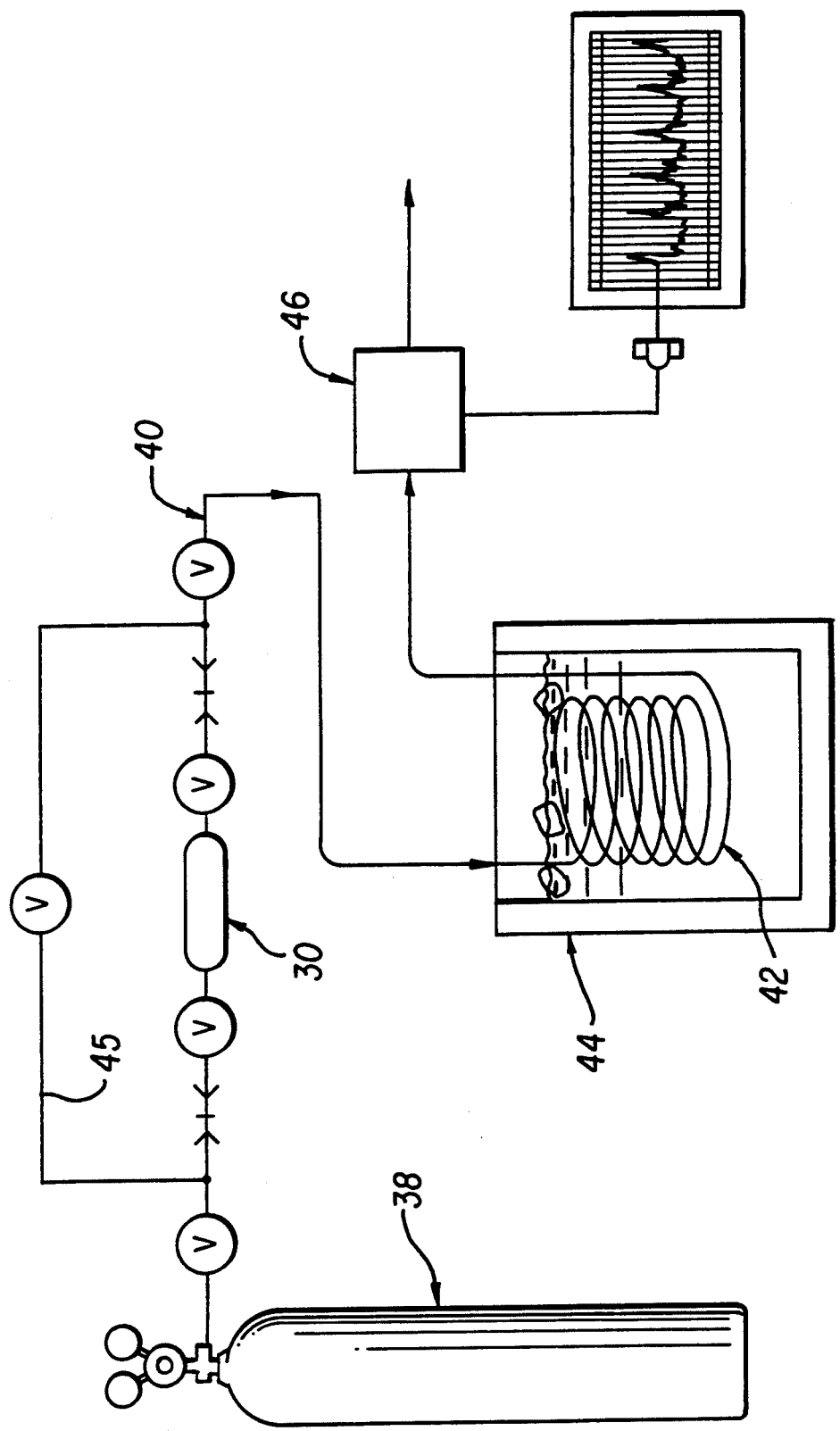
FIG. 2 illustrates, schematically, an analysis technique in accordance with an embodiment of the present invention.

In accordance with a preferred embodiment of the present invention the measuring means further includes, as illustrated in FIG. 2, utilizing helium from a cylinder 38 to sparge the sample collected in the sampler 30 to provide a gaseous mixture comprising, for example, helium, argon, water vapor, nitrogen and oxygen. Means in the nature of a flowpath 40 is provided for passing the gaseous mixture through an absorbent column 42 located in a dewar flask 44 containing a coolant at a temperature such that the column 42 is at a temperature at which only the helium passes through the column.

Once the gases other than helium have been adsorbed on the adsorbent column the temperature of the column can be raised as by removing the dewar flask 44 from about the column. The helium then can be flowed through the column 42, through the sampler 30 as illustrated or via a separate flowpath 45. An appropriate sensor 46 is present for measuring the amount of argon released from the column 42. If there is any hydrogen adsorbed on the column, which can happen in some instances, it will be the first element to exit the column 42. The hydrogen is then followed by argon, then by nitrogen, then by oxygen, and then by water. Thus, a single peak indicates the amount of argon. If helium is used as the inert gas, this procedure is modified by using another gas, for example, nitrogen or argon, to carry out the sparging and the desorption.

Various very high sensitivity detectors can be used as the sensor 46. For example, an ultrasonic detector can be used or a nuclear magnetic resonance detector. The sensitivity of the detector chosen is a matter of design choice depending upon the amount of dilution of the argon or other inert gas tracer that takes place in the system. Such detectors are capable of measuring argon in the parts per trillion range.

In accordance with the present invention the inert gas can be a noble gas (helium, neon, argon, krypton or radon) and preferably a noble gas other than radon since radon is radioactive. The inert gas can also be, for example, nitrogen. However, since a great deal of nitrogen will already be dissolved in the test liquid, particularly when that liquid is water, the use of nitrogen will generally require a removal of nitrogen from the test liquid. Argon is the preferred gas of choice because of its relatively high solubility in water, its ready availability, its low cost and the fact that sensors are available having a high sensitivity for this element.

The column 42 may have any of a number of packings in it, for example, the column might be a molecular sieve column or a silica gel column. Generally the adsorbtion which takes place in the column is determined primarily by the size of the elements or molecules being held up in the column and not by chemical interaction with the column. A suitable temperature for retaining the hydrogen, oxygen, nitrogen, water and argon in the column 42 is about $-20°$ C. However, this temperature is not critical and can vary considerably depending on the particular material utilized in the column 42. Indeed, there are columns 42 which will hold up these elements at room temperature and, in that instance, it may be necessary to heat the column 42 in order to eject the hydrogen, oxygen, argon, nitrogen, water, etc.

The calculation of flowrate is very easily carried out. The amount of argon entering the system upstream of the flowmeter 22 is known. The amount of argon in the liquid downstream of the flowmeter 22 is measured. As a result, a dilution factor can be calculated and this dilution factor, along with knowledge of the original amount of argon inserted, allows one to calculate in a straightforward manner the rate of fluid flow in the system. Typically the dilution will be at least about $15 \times 10^{-6}$ to 1.

The test solution which is inserted into the flow system 12 upstream of the flowmeter 22 is generally a saturated solution of argon in the same liquid as is flowing in the flowpath 12. In other words, if water is being used in the flowpath 12 then a saturated solution of argon in water is utilized for insertion upstream of the flowmeter 22. Use of a saturated solution (at a known temperature) assures that the argon concentration is accurately known and provides the greatest sensitivity as the argon concentration is as high as it can possibly be.

The method of the present invention is to inject the known volume of the liquid test solution into the flowpath upstream of the flowmeter 22 with the solution having dissolved in it a known concentration of an inert gas. The indicated liquid flowrate, as indicated by the flowmeter 22, is determined. The concentration of the inert gas present in the condensed fluid (liquid) is measured at a position in the flowpath downstream of the flowmeter 22, for example utilizing the sampler 30, for calibration of the flowmeter 22. This allows a determination of the true flowrate which corresponds to the flowrate indicated by the flowmeter 22. The argon causes no problem in the fluid since it does not cause any corrosion, it is easy to handle since it is not radioactive, it is readily available and inexpensive, and, any excess fed into the atmosphere will cause no problems.

INDUSTRIAL APPLICABILITY

The method and apparatus of the present invention are particularly useful for calibrating flowmeters in systems such as the heat transfer systems of power plants.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A method of calibrating a flowmeter in a system having a condensible fluid flowing in a flowpath therein, comprising:
   injecting a known volume of a liquid test solution into said flowpath upstream of said flowmeter, said solution having dissolved therein a known concentration of an inert gas not otherwise present in said fluid;
   observing the indicated flowrate indicated by said flowmeter;
   measuring the concentration of said inert gas present in a condensed form of said fluid at a position in said flowpath downstream of said flowmeter; and
   determining the true flowrate corresponding to the indicated flowrate.

2. A method as set forth in claim 1, wherein said inert gas is a nobel gas.

3. A method as set out in claim 2, wherein said inert gas is helium, neon, argon or krypton.

4. A method as set forth in claim 3, wherein said inert gas comprises argon.

5. A method as set forth in claim 3, wherein said measuring comprises removing a sample of said condensed form of said fluid and analyzing the sample.

6. A method as forth in claim 5, wherein said noble gas comprises argon and said measuring further comprises sparging said sample with helium to provide a gaseous mixture comprising helium, argon, water vapor, nitrogen and oxygen, passing said gaseous mixture through an adsorbent column at a temperature at which only the helium passes through the column, raising the temperature of the column to one at which the adsorbed components are sequentially released while flowing helium through the column and measuring the amount of argon released from the column.

7. A method as set forth in claim 6, wherein said test solution is saturated with said argon.

8. A method as set forth in claim 3, wherein said system is a heat transfer system of a power plant.

9. A method as set forth in claim 8, wherein said fluid comprises water.

10. A method as set forth in claim 1, wherein said solution is saturated with said inert gas.

11. An apparatus for calibrating a flowmeter in a sealed system having a condensible fluid flowing in a flow path therein, comprising:
    insertion means for inserting a known volume of a test solution having a known concentration of an inert gas dissolved therein into said system upstream of said flowmeter;
    measuring means for measuring the concentration of said inert gas in a condensed form of said fluid at a position in said system downstream of said flowmeter; and
    comparison means for comparing the true flowrate as calculated from the concentration of said inert gas measured by said measuring means with the indicated flowrate as indicated by said flowmeter.

12. An apparatus as set forth in claim 11, wherein said inert gas is a nobel gas.

13. An, apparatus as set out in claim 12, wherein said noble gas is helium, neon, argon or krypton.

14. An apparatus as set forth in claim 13, wherein said noble gas comprises argon.

15. An apparatus as set forth in claim 13, wherein said measuring means comprises means for removing a sample of said condensed form of said fluid and means for analyzing the sample.

16. An apparatus as forth in claim 15, wherein said noble gas comprises argon and said measuring means further comprises means for sparging said sample with helium to provide a gaseous mixture comprising helium, argon, water vapor, nitrogen and oxygen, means for passing said gaseous mixture through an adsorbent column at a temperature at which only the helium passes through the column, means for flowing helium through the column while the temperature of the column is one at which the adsorbed components are sequentially released and means for measuring the amount of argon released from the column.

17. An apparatus as set forth in claim 16, wherein said test solution is saturated with said argon.

18. An apparatus as set forth in claim 13, wherein said system is a heat transfer system of a power plant.

19. An apparatus as set forth in claim 18, wherein said fluid comprises water.

20. An apparatus as set forth in claim 11, wherein said solution is saturated with said inert gas.

21. A method of calibrating a flowmeter in a system having a condensible fluid flowing in a flowpath therein, comprising:
    injecting a known volume of a liquid test solution into said flowpath upstream of said flowmeter, said solution having dissolved therein a known concentration of an inert gas not otherwise present in said fluid;
    observing the flowrate indicated by said flowmeter;
    measuring the concentration of said inert gas present in a condensed form of said fluid at a position in said flowpath downstream of said flowmeter; and
    determining the true flowrate corresponding to the indicated flowrate;
    wherein said measuring further comprises sparging said sample with a carrier gas to provide a gaseous mixture comprising the carrier gas, the inert gas, water vapor, nitrogen and oxygen, passing said gaseous mixture through an adsorbent column at a temperature at which only the carrier gas passes through the column, raising the temperature of the column to one at which the adsorbed components are sequentially released while flowing the carrier gas through the column and measuring the amount of the argon gas released from the column.

22. A method as set forth in claim 21, wherein said carrier gas is helium.

23. A method as set forth in claim 22, wherein said inert gas is argon.

24. A method as set forth in claim 21, wherein said carrier gas is helium.

25. A method as set forth in claim 21, wherein said test solution is saturated with said argon.

26. A method as set forth in claim 21, wherein said solution is saturated with said inert gas.

27. A method as set forth in claim 21, wherein said inert gas is a noble gas.

28. A method as set out in claim 27, wherein said inert gas is helium, neon, argon or krypton.

29. A method as set forth in claim 28, wherein said inert gas comprises argon.

30. A method as set forth in claim 28, wherein said measuring comprises removing a sample of said condensed form of said fluid and analyzing the sample.

31. A method as set forth in claim 28, wherein said system is a heat transfer system of a power plant.

32. A method as set forth in claim 31, wherein said fluid comprises water.

33. An apparatus for calibrating a flowmeter in a sealed system having a condensible fluid flowing in a flow path therein, comprising:

insertion means for inserting a known volume of a test solution having a known concentration of an inert gas dissolved therein into said system upstream of said flowmeter;

measuring means for measuring the concentration of said inert gas in a condensed form of said fluid at a position in said system downstream of said flowmeter; and comparison means for comparing the true flowrate as calculated from the concentration of said inert gas measured by said measuring means with the indicated flowrate as indicated by said flowmeter;

wherein said measuring means comprises means for removing a sample of said condensed form of said fluid and means for analyzing the sample; and, wherein said measuring means further comprises means for sparging said sample with a carrier gas to provide a gaseous mixture comprising the carrier gas, the inert gas, water vapor, nitrogen and oxygen, means for passing said gaseous mixture through an adsorbent column at a temperature at which only the carrier gas passes through the column, means for flowing the carrier gas through the column while the temperature of the column is one at which the adsorbed components are sequentially released and means for measuring the amount of inert gas released from the column.

34. An apparatus as set forth in claim 33, wherein said carrier gas is helium.

35. An apparatus as set forth in claim 34, wherein said inert gas is argon.

36. An apparatus as set forth in claim 33, wherein said inert gas is argon.

37. An apparatus as set forth in claim 33, wherein said test solution is saturated with said argon.

38. An apparatus as set forth in claim 33, wherein said noble inert gas is a noble gas.

39. An apparatus as set out in claim 38, wherein said noble gas is helium, neon, argon or krypton.

40. An apparatus as set forth in claim 39, wherein said gas comprises argon.

41. An apparatus as set forth in claim 39, wherein said system is a heat transfer system of a power plant.

42. An apparatus as set forth in claim 41, wherein said fluid comprises water.

43. An apparatus as set forth in claim 33, wherein said solution is saturated with said inert gas.

* * * * *